United States Patent
Goulds et al.

(10) Patent No.: US 10,024,242 B2
(45) Date of Patent: Jul. 17, 2018

(54) GAS TURBINE ENGINE WITH A FIRE WALL AND AN OFF-TAKE DEVICE

(71) Applicant: ROLLS-ROYCE PLC, London (GB)

(72) Inventors: Robert Goulds, Derby (GB); Brian Richard Lace, Derby (GB); Richard Peace, Derby (GB)

(73) Assignee: ROLLS-ROYCE plc, London (GB)

( * ) Notice: Subject to any disclaimer, the term of this patent is extended or adjusted under 35 U.S.C. 154(b) by 698 days.

(21) Appl. No.: 14/487,835

(22) Filed: Sep. 16, 2014

(65) Prior Publication Data

US 2015/0101331 A1     Apr. 16, 2015

(30) Foreign Application Priority Data

Oct. 10, 2013   (GB) ................................... 1317924.7

(51) Int. Cl.
*F02C 7/32*     (2006.01)
*F01D 25/12*   (2006.01)
(Continued)

(52) U.S. Cl.
CPC ............... *F02C 7/32* (2013.01); *F01D 25/08* (2013.01); *F01D 25/12* (2013.01); *F01D 25/14* (2013.01);
(Continued)

(58) Field of Classification Search
CPC ... B64D 43/02; F02C 7/18; F02C 7/32; F02C 7/125; F02C 7/28; F02C 7/25; F02C 7/12;
(Continued)

(56) References Cited

U.S. PATENT DOCUMENTS 3,584,518 A * 6/1971 Hurlow .................. F16C 1/10
                                                                74/502.5
3,733,815 A * 5/1973 Karol .................... F02C 7/36
                                                                60/39.281
(Continued)

FOREIGN PATENT DOCUMENTS

EP    1 443 227 A1    8/2004
EP    2 415 992 A2    2/2012
GB    2 103 289 A     2/1983

OTHER PUBLICATIONS

Jan. 21, 2015 Search Report issued in European Application No. 14184880.
(Continued)

*Primary Examiner* — Gerald L Sung
*Assistant Examiner* — Scott Walthour
(74) *Attorney, Agent, or Firm* — Oliff PLC

(57) ABSTRACT

A gas turbine engine having a fire wall configured to provide a fire resistant barrier between a first zone and a second zone in the gas turbine engine, the second zone being hotter than the first zone. The gas turbine engine also has: (i) an actuator located in the first zone, (ii) an actuatable device that is located in the second zone, (iii) a bypass duct, (iv) an off-take device to extract cooling air from the bypass duct in the gas turbine engine and to supply the extracted cooling air into the elongate housing/shell, the off-take device having a first passage and a second passage, and (v) a mechanical force transmitting device that extends from the actuator to the actuatable device via a hole in the fire wall. The mechanical force transmitting device is configured to actuate the actuatable device by transmitting a mechanical force to the actuatable device.

9 Claims, 6 Drawing Sheets

(51) Int. Cl.
*F01D 25/14* (2006.01)
*F02C 7/24* (2006.01)
*F02C 7/12* (2006.01)
*F01D 25/08* (2006.01)
*F02C 7/25* (2006.01)
*F02C 7/28* (2006.01)
*F16C 1/10* (2006.01)
*F16C 1/26* (2006.01)
*F02C 3/14* (2006.01)
*F02C 7/18* (2006.01)
*F02C 6/04* (2006.01)
*F02C 6/06* (2006.01)
*F02C 6/08* (2006.01)

(52) U.S. Cl.
CPC ............. *F01D 25/145* (2013.01); *F02C 3/14* (2013.01); *F02C 7/12* (2013.01); *F02C 7/125* (2013.01); *F02C 7/18* (2013.01); *F02C 7/24* (2013.01); *F02C 7/25* (2013.01); *F02C 7/28* (2013.01); *F16C 1/10* (2013.01); *F16C 1/262* (2013.01); *F02C 6/04* (2013.01); *F02C 6/06* (2013.01); *F02C 6/08* (2013.01); *F05D 2260/20* (2013.01); *F05D 2260/50* (2013.01); *F16C 1/103* (2013.01); *F16C 2360/23* (2013.01)

(58) Field of Classification Search
CPC ...... F02C 7/24; F02C 6/04; F02C 6/06; F02C 6/08; F01D 25/08; F01D 25/12; F01D 25/14; F01D 25/145; F01D 9/06; F16C 1/10; F16C 1/262; F16C 1/103; F16C 2360/23; F05D 2260/50; F05D 2260/20
See application file for complete search history.

(56) References Cited

U.S. PATENT DOCUMENTS

| | | | |
|---|---|---|---|
| 5,239,817 A * | 8/1993 | Mildenstein | A62C 2/248 244/129.2 |
| 5,458,343 A * | 10/1995 | Dornfeld | F16L 5/08 277/503 |
| 6,321,893 B1 | 11/2001 | Muhlert et al. | |
| 7,434,451 B2 | 10/2008 | Smith | |
| 2005/0097882 A1 | 5/2005 | Cazenave et al. | |
| 2008/0147255 A1* | 6/2008 | Alwin | B64C 13/16 701/14 |
| 2009/0188234 A1* | 7/2009 | Suciu | F02C 7/14 60/262 |
| 2010/0150700 A1 | 6/2010 | Strecker et al. | |
| 2011/0182716 A1* | 7/2011 | Bouru | F01D 17/16 415/148 |
| 2013/0341547 A1 | 12/2013 | LeBlanc et al. | |

OTHER PUBLICATIONS

May 28, 2014 Search Report issued in British Application No. 1317924.7.

* cited by examiner

GAS TURBINE ENGINE WITH A FIRE WALL AND AN OFF-TAKE DEVICE

CROSS-REFERENCE TO RELATED APPLICATIONS

This application is based upon and claims the benefit of priority from British Patent Application Number GB1317924.7 filed 10 Oct. 2014, the entire contents of which are incorporated by reference.

BACKGROUND OF THE INVENTION

1. Field of the Disclosure

The present invention relates to a gas turbine engine having a fire wall and an actuatable device.

2. Description of the Related Art

It is common for a gas turbine engine to include a fire wall that is configured to provide a fire resistant barrier between a first zone and a second zone in the gas turbine engine, the second zone being hotter than the first zone when the gas turbine engine is in use.

It is also common for a gas turbine engine to include one or more actuatable devices configured to be actuated by a mechanical force. An example of such a device is a turbine case cooling valve.

In existing gas turbine engines, actuatable devices are usually configured to be actuated by hydraulic/pneumatic motive power, e.g. by using either fuel (typically sealed within a closed system of pipes and valves) or air to actuate the actuatable device.

The present inventors have observed that gas turbine engines are getting progressively hotter and that in very hot zones of a modern gas turbine engine, e.g. zones having a temperature of 300° C.-400° C. or higher, hydraulic motive power may not provide a reliable actuation mechanism for an actuatable device. In detail, the inventors have observed that using fuel as a source of hydraulic motive power at such temperatures can lead to the fuel heating up, breaking down and starting to coke, potentially leaving carbon deposits (e.g. in the closed system of pipes and valves). Similarly, the inventors have observed that using air as a source of pneumatic motive power at such temperatures can be problematic as air driven motors don't tend to work at such temperatures.

Such problems can be ameliorated by cooling the actuatable device, but the inventors have found that mechanisms for cooling an actuatable device tend to be complex, lossy, and only work up to certain temperatures.

The present invention has been devised in light of the above considerations.

OBJECTS AND SUMMARY

A first aspect of the invention may provide a gas turbine engine having:
- a fire wall that is configured to provide a fire resistant barrier between a first zone and a second zone in the gas turbine engine, the second zone being hotter than the first zone when the gas turbine engine is in use;
- an actuator that is located in the first zone and is configured to generate a mechanical force when operated;
- an actuatable device that is located in the second zone and is configured to be actuated by a mechanical force;
- a mechanical force transmitting device that extends from the actuator to the actuatable device via a hole in the fire wall;

wherein the mechanical force transmitting device is configured to, when the actuator is operated, actuate the actuatable device by transmitting a mechanical force generated by the actuator to the actuatable device.

In this way, the actuatable device can be actuated by the actuator, even if the second zone is too hot for conventional actuation mechanisms (see above) to work reliably.

In view of modern gas turbine engine design, the second zone may have a temperature of 300° C. or higher, or even 400° C. or higher when the gas turbine engine is in use.

Preferably, the mechanical force transmitting device includes an elongate element configured to move along a linear path so as to transmit a mechanical force generated by the actuator to the actuatable device. For the avoidance of any doubt, the linear path along which the elongate element extends could e.g. be straight or curved.

Preferably, the elongate element is flexible. For example, the elongate element may be flexible cable, in which case the elongate element may be referred to as a "Bowden cable". However, in other embodiments, the elongate element could be rigid, e.g. it could be a piston or a push/pull rod.

The actuator may be configured to generate a mechanical force that pushes/pulls the elongate element along the linear path when operated.

The mechanical force transmitting device may include an elongate housing/shell, wherein the elongate element is configured to move along a linear path within the elongate housing/shell. If the elongate element is flexible, the elongate housing/shell may also be flexible.

Preferably, the gas turbine engine includes a device for supplying coolant to be guided into the elongate housing/shell when the gas turbine is in use. In this way, coolant can be used to cool the elongate element and the elongate housing/shell.

Preferably, the coolant is cooling air, preferably extracted from an airflow in the gas turbine engine, more preferably extracted from a bypass airflow in the gas turbine engine.

Preferably, the gas turbine engine includes an off-take device for extracting cooling air from an airflow in the gas turbine engine and for supplying the extracted cooling air to be guided into the elongate housing/shell when the gas turbine engine is in use.

Preferably, the airflow (from which cooling air is extracted) is a bypass airflow in the gas turbine engine, in which case the off-take device may be referred to as a bypass off-take device.

An inlet of the off-take device may be formed in a strut of the gas turbine engine, e.g. wherein the strut stands in an airflow of the gas turbine engine.

Preferably, the off-take device is configured so that the extracted cooling air is at a pressure that is higher than the static pressure of the airflow (from which the cooling air has been extracted), more preferably so that the extracted cooling air is at a pressure that is at or close to the total pressure of the airflow.

In this way, the extracted cooling air is able to have an elevated pressure compared to the pressure in the first and second zones (which may be at a pressure that is the same as or similar to the static pressure of the airflow, see below), thereby providing a pressure differential for continually driving the extracted cooling air through the elongate housing/shell.

Example off-take devices configured so that the extracted cooling air is at a pressure that is higher than the static pressure of the airflow are described below. One example is a Pitot tube.

The off-take device may be configured as described in the second aspect of this invention, below. For example, the off-take device may have:

a first passage that extends from an inlet to an outlet in the direction of the airflow, wherein the cross-sectional area of the first passage, as measured in a direction perpendicular to the direction of airflow, increases and then decreases as the passage progresses in the direction of the airflow;

a second passage for extracting the portion of air from the airflow, wherein the second passage has an inlet that is a hole formed in a sidewall of the first passage between the inlet and outlet of the first passage.

The elongate housing/shell may include a coolant dumping device, preferably located at or near to an end of the elongate housing/shell in the second zone, for allowing spent coolant to exit the elongate housing/shell in the second zone. The coolant dumping device may include one or more holes, for example.

Preferably, the hole in the fire wall (through which the mechanical force transmitting device extends) is sealed.

Preferably, the gas turbine engine includes a sealing unit which seals the hole in the fire wall (through which the mechanical force transmitting device extends).

The sealing unit may include a cavity for guiding coolant from the off-take device into the elongate housing/shell when the gas turbine is in use.

The sealing unit may include a through-hole, with the elongate element (described above) passing through the through-hole.

The sealing unit may include one or more seals for inhibiting/preventing coolant from flowing out of (e.g. the cavity in) the sealing unit into the first zone. Preferably, the one or more seals surround the elongate element.

The one or more seals may include a primary seal and a secondary seal. This arrangement may allow materials for the primary and secondary seals to be chosen in a manner that optimises the seal. For example, the material of these seals could be chosen such that the primary seal provides a better seal (i.e. is more effective at inhibiting the flow of coolant out of the sealing unit) than the secondary seal, but is more susceptible to fire than the secondary seal. For example, the primary seal may be of PTFE and the secondary seal may be of carbon.

The actuator may be configured to be operated by hydraulic motive power, pneumatic motive power and/or electrical power. Hydraulic motive power is preferred.

In most applications, the fire wall will be required to be fire proof, e.g. by airworthiness regulations.

As the first and second zones are separated by a fire wall, they may be referred to as fire zones herein.

Preferably, each zone is ventilated, i.e. configured to have a continual flow of air running through the zone when the gas turbine engine is in use. The air running through each zone may be extracted from an airflow (preferably a bypass airflow) in the gas turbine engine, preferably at a pressure that is the same as or similar to the static pressure of the airflow. Preferably, the gas turbine engine is configured so that the ventilation flow in each zone is separated from the other zone, e.g. so as to inhibit the spread of fire in the event of a fire. In most applications, fire zones in gas turbine engines having such features are required to be present, e.g. by airworthiness regulations.

A second aspect of the invention may provide an off-take device for extracting air from an airflow in the gas turbine engine at a pressure that is higher than the static pressure of the airflow, wherein the off-take device has:

a first passage that extends from an inlet to an outlet in the direction of the airflow, wherein the cross-sectional area of the first passage, as measured in a direction perpendicular to the direction of airflow, increases and then decreases as the first passage progresses in the direction of the airflow;

a second passage for extracting air from the airflow, wherein the second passage has an inlet that is a hole formed in a sidewall of the first passage between the inlet and outlet of the first passage.

Because the first passage has a cross-sectional area that increases and then decreases as the first passage progresses in the direction of the airflow (which can be thought of as a shaped expansion in the first passage), it is thought that the reverse Venturi effect will elevate the pressure of the extracted air to be above that of the static pressure of the airflow. This may be useful, for example, for supplying coolant to be guided into an elongate housing/shell as described in connection with the first aspect of the invention (see above).

Preferably, the cross-sectional area of the first passage smoothly (i.e. without discontinuity) increases and then decreases as the passage progresses in the direction of the airflow.

Preferably, the inlet of the second passage is formed at or close to (e.g. within a distance that is no more than 10% of the length of the first passage) the point along the length of the first passage at which the cross-sectional area of the first passage reaches a maximum.

The inlet of the off-take device may be formed in a strut of the gas turbine engine, e.g. wherein the strut stands in an airflow of the gas turbine engine.

The invention also includes any combination of the aspects and preferred features described except where such a combination is clearly impermissible or expressly avoided.

BRIEF DESCRIPTION OF THE DRAWINGS

Embodiments of the invention will now be described by way of example with reference to the accompanying drawings in which.

DETAILED DESCRIPTION OF EMBODIMENTS

Figure 1:
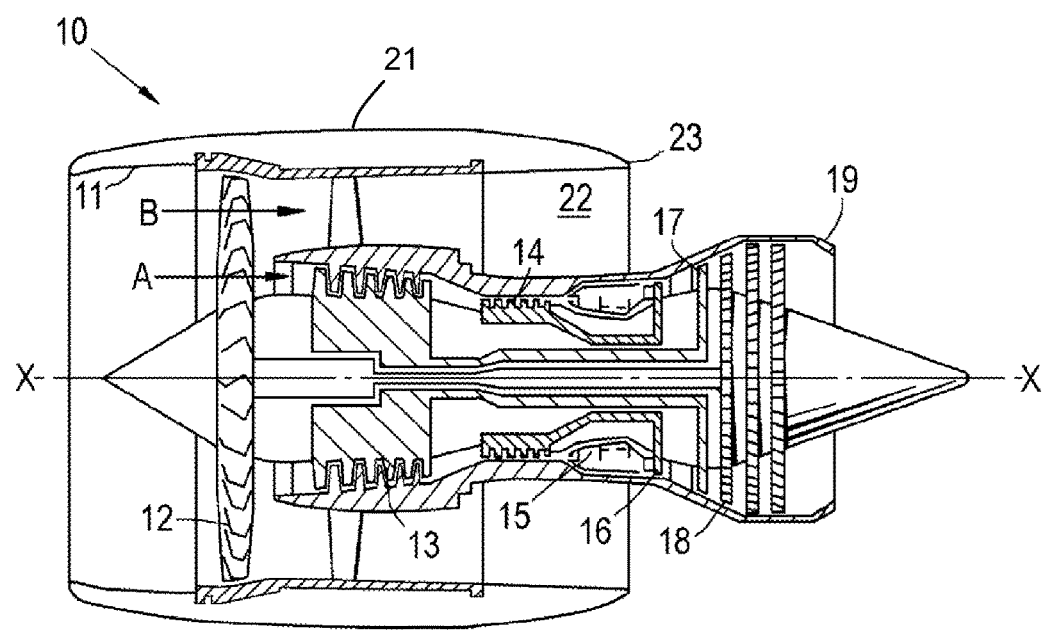
FIG. 1 shows a ducted fan gas turbine engine.

With reference to FIG. 1, a ducted fan gas turbine engine which may incorporate the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated/compressed by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

For the avoidance of any doubt it is noted that whilst FIG. 1 depicts a three spool engine 10, the invention could equally be incorporated in another type of engine, e.g. a two spool engine.

In general, the following discussion describes examples of the inventors' proposals that may be viewed as providing a linear dynamic seal for a fire wall in a gas turbine engine. In the example described below, a remote actuatable device (e.g. a turbine case cooling valve) located in the second fire zone (which may be a very hot area) is actuated by a mechanical force generated by a separate actuator which is located in the first fire zone (which may be a cooler, more benign area). The actuator and the actuatable device are in different fire zones and the fire wall between them is preferably kept fire proof in the event of a fire such that fire in one fire zone will not spread to the other fire zone.

Figure 2:
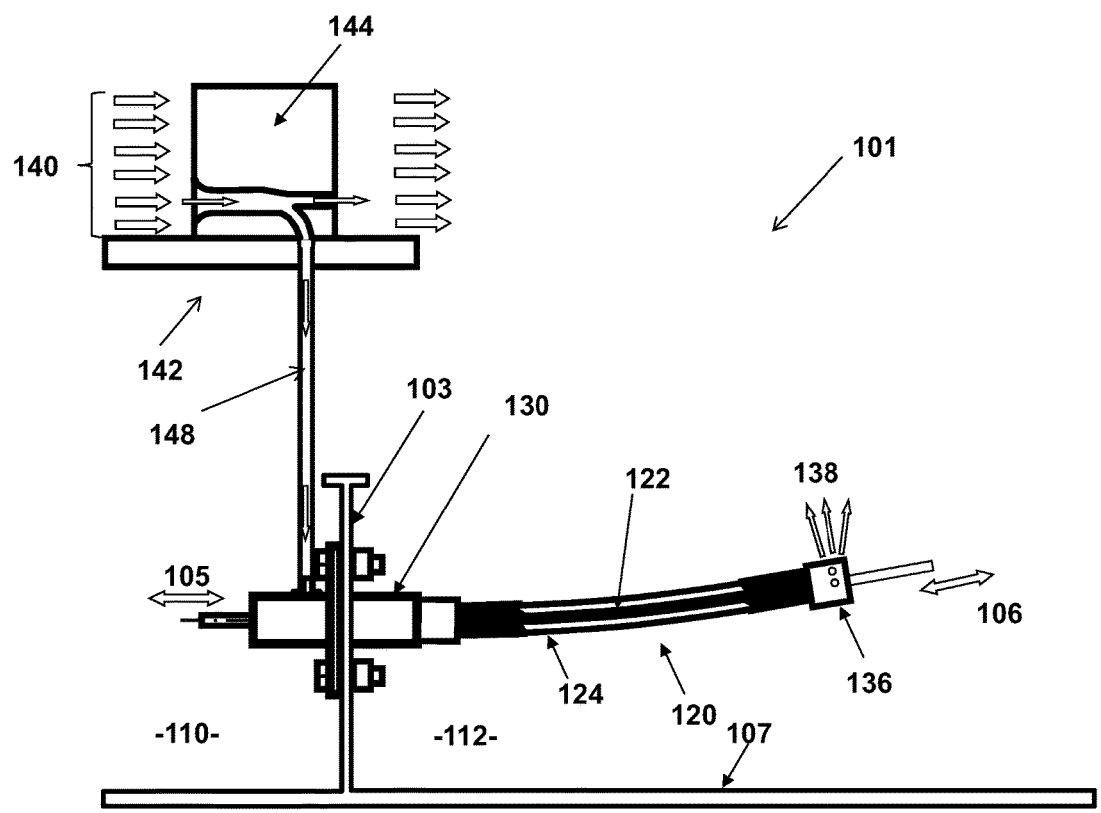
FIG. 2 shows an actuation mechanism for use in the gas turbine engine of FIG. 1.

FIG. 2 shows an actuation mechanism 101 for use in the gas turbine engine 10 of FIG. 1.

As shown in FIG. 2, the gas turbine engine 10 has a fire wall 103 that is configured to provide a fire resistant barrier between a first fire zone 110 and a second fire zone 112 in the gas turbine engine 10.

For a three spool engine such as that shown in FIG. 1, the second fire zone 112 may be a region radially outside of a core engine casing 107 of the gas turbine engine, wherein the core engine casing 107 contains the combustion chamber and the compressor of the gas turbine engine. The first fire zone 110 may be further forward in the gas turbine engine 10 compared with the second fire zone 112, i.e. upstream of the combustion chamber.

Preferably, both the first and second fire zones 110, 112 are ventilated, i.e. configured to have a continual flow of air running through the fire zone when the gas turbine 10 is in use. The air running through each fire zone may be extracted from a bypass airflow 140, preferably at a pressure that is the same as or similar to the static pressure of the bypass airflow 140.

There may be a pressure differential between these first and second fire zones 110, 112 which, in the event of a fire, would drive the flames and flammable fluids (including air) through the fire wall 103 if special provision were not made.

In this example, the second fire zone 112 is hotter than the first fire zone 110 when the gas turbine engine 10 is in use. For example, the second fire zone 112 may be 430° C. when the gas turbine engine 10 is in use, whereas the first fire zone 110 may be cooler than 300° C., e.g. 240° C. when the gas turbine engine 10 is in use.

Preferably, the actuation mechanism 101 includes an actuator (not shown) that is located in the first fire zone 110 and is configured to generate a mechanical force when operated, e.g. to provide push/pull motion 105. The actuator may be a linear actuator and may be powered electrically, pneumatically or hydraulically, for example.

In a preferred example, the actuator is a fuel driven valve, which is preferably driven by high pressure fuel.

Preferably, the actuation mechanism 101 also includes an actuatable device (not shown) that is located in the second fire zone 112 and is configured to be actuated by a mechanical force. The actuatable device may be a turbine case cooling valve, for example.

Preferably, the actuation mechanism also includes a mechanical force transmitting device 120 that extends from the actuator to the actuatable device via a hole in the fire wall 103. Preferably, the mechanical force transmitting device 120 is configured to, when the actuator is operated, actuate the actuatable device by transmitting a mechanical force generated by the actuator to the actuatable device so as to actuate the actuatable device, e.g. by providing the push/pull motion 106 at the actuatable device.

Preferably, the mechanical force transmitting device 120 includes a flexible cable 122 (which may be referred to as a "Bowden cable") configured to move along a linear path so as to transmit a mechanical force generated by the actuator to the actuatable device. The mechanical force transmitting device preferably includes a flexible elongate housing/shell 124, wherein the flexible cable 122 is configured to move along a linear path within the elongate housing/shell 124.

The flexible elongate housing/shell 124 may be referred to herein as a "cable cooling shroud" for reasons that shall become apparent below.

Preferably, the gas turbine engine 10 includes a sealing unit 130 which seals the hole in the fire wall 103 through which the mechanical force transmitting device 120 extends.

The sealing unit 130 will be described in more detail below with reference to FIG. 3.

Preferably, the gas turbine engine 10 also includes a bypass off-take device 142 for extracting cooling air from a bypass airflow 140 in the gas turbine engine 10 and for supplying the extracted cooling air to be guided into the elongate housing/shell 124 when the gas turbine engine 10 is in use.

Preferably, the bypass off-take device 142 is configured to extract cooling air at a pressure that is at or close to the total pressure of the bypass airflow 140.

The bypass off-take device 142 supplies the extracted cooling air to be guided into the elongate housing/shell 124 via a passage 148 (which may incorporate a tube), where it is supplied to the sealing unit 130, which preferably includes a cavity 131 (see FIG. 3) for guiding the cooling air into the elongate housing/shell 124 when the gas turbine engine 10 is in use.

Note that the extracted cooling air guided into the elongate housing/shell 124 is at a pressure that is higher than the static pressure of the bypass airflow 140, thereby providing a pressure differential for continually driving the extracted cooling air through the elongate housing/shell 124 (since the pressure in the first and second fire zones is at or close to the static pressure of the bypass airflow 140, see above). This means that cooling air is able to continually flow through the elongate housing/shell 124 to provide continuous cooling to the flexible cable 122 and the elongate housing/shell 124.

Figure 3:
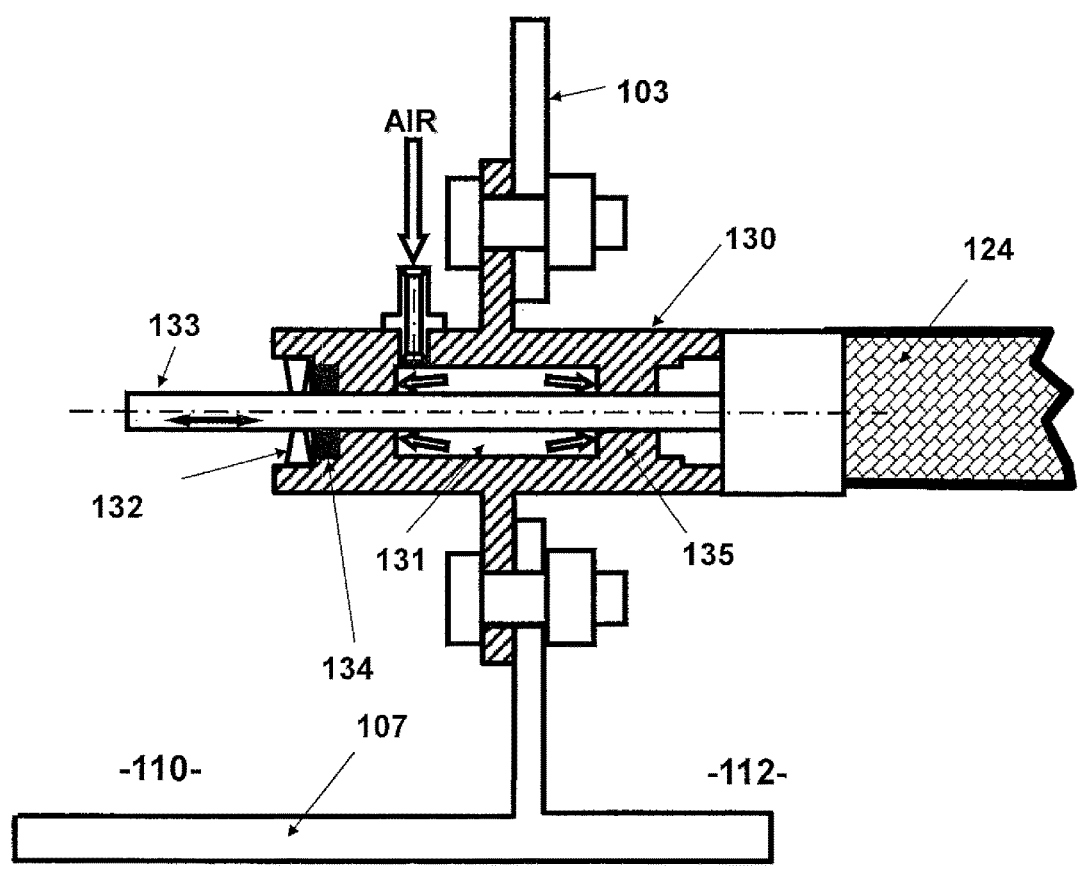
FIG. 3 shows the sealing unit of FIG. 2 in more detail.

FIG. 3 shows the sealing unit 130 of FIG. 2 in more detail.

The sealing unit 130 may form part of the mechanical force transmitting device 120. For example, the sealing unit 130 may include a pushrod 133 that may be attached to the actuator and may be configured to transmit a push/pull force from the actuator to the flexible cable 122.

Preferably, the sealing unit 130 has a cavity 131 for receiving cooling air from the bypass off-take device 142 and is preferably configured to guide air supplied by the bypass off-take 140 into the elongate housing/shell 124 when the gas turbine engine 10 is in use.

The main body of the sealing unit 130 may be of stainless steel.

To the left of the cavity 131, the sealing unit 130 may include a primary seal 132 and a secondary seal 134 for inhibiting/preventing cooling air from flowing out of (e.g. the cavity 131 in) the sealing unit 130 into the first fire zone 110. Each seal, 132, 134 surrounds the pushrod 133. The primary seal 132 may be of PTFE or similar material and preferably seals well but may be vulnerable to damage in the event of a fire. The secondary seal 134 may be of carbon and preferably seals adequately well whilst being fire proof. Hence, in service, a high level of sealing may be achieved but in the event of a fire, the sealing can still be adequate.

To the right of the cavity 131, there is preferably a cable guide 135 rather than seal so that the cavity 131 guides cooling air from the bypass off-take device 142 into the elongate housing/shell 124, which shall herein be referred to as the cable cooling shroud or simply "shroud" 124.

Preferably, the shroud 124 is essentially leak free and the cooling air passes around the flexible cable 122 to thermally protect it.

The elongate housing/shell 124 may include a coolant dumping device 136, located at the end of the elongate housing/shell 124, for allowing spent cooling air 138 to exit the shroud 124 in the second fire zone 112. In this example, the coolant dumping device 136 is a "pepperpot" that includes a hole or series of holes.

Note that a continual flow of cooling air through the shroud 124 is important in order to provide effective cooling.

Also note that a typical Bowden cable as might be used in aeronautical applications has a temperature limit of around 300 C, but here is used in a location of around 430° C. and would degrade if not protected. There are currently no Bowden cables known to the inventors that would be capable of meeting a 430° C. requirement.

Figure 4:
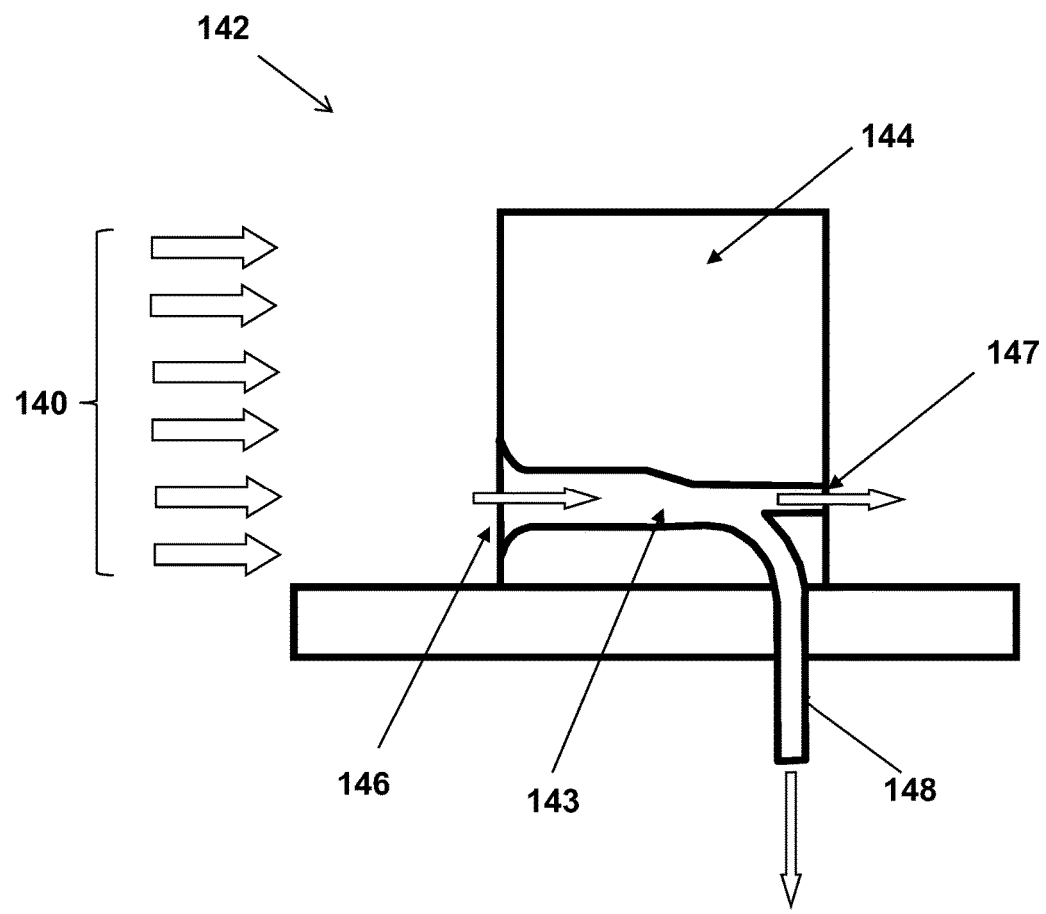
FIG. 4 shows the bypass off-take device of FIG. 2 in more detail.

FIG. 4 shows the bypass off-take device 142 of FIG. 2 in more detail.

The bypass off-take device 142 illustrated in FIG. 4 is the presently preferred geometry for a bypass off-take device.

As shown in FIG. 4, the bypass off-take device 142 has a first passage 143 that extends from an inlet 146 (which may be an aerodynamic off-take) to an outlet 147 in the direction of the bypass airflow 140, and a second passage 148 for extracting cooling air from the bypass airflow 140, wherein the second passage 148 has an inlet that is a hole formed in a sidewall of the first passage 143 between the inlet 146 and outlet 147 of the first passage 143.

The inlet 146 may be formed in a strut 144 of the gas turbine engine (e.g. an "A" frame spat standing in bypass airflow 140).

The second passage, which may include a tube, preferably guides the extracted cooling air to the sealing unit 130, e.g. as previously described.

Preferably, the cross-sectional area of the first passage 143, as measured in a direction perpendicular to the direction of the bypass airflow 140 decreases as the first passage 143 progresses in the direction of the bypass airflow 140. This helps to increase the flow speed of the extracted cooling air in the first passage 143.

Preferably, the second passage 148 forms an acute angle with the first passage 143 where it meets the first passage 143, and preferably curves gradually away from the first passage 143 so as to maximise the pressure of the extracted cooling air.

The geometry shown in FIG. 4 is presently preferred by the inventors as the pressure of the extracted cooling air is roughly equal to the total pressure of the bypass airflow 140 and foreign objects entering the first passage 143 should mostly pass through the first passage 143 without blocking the second passage 148.

There are alternatives to the bypass off-take device 142 illustrated in FIG. 4.

Figure 5:
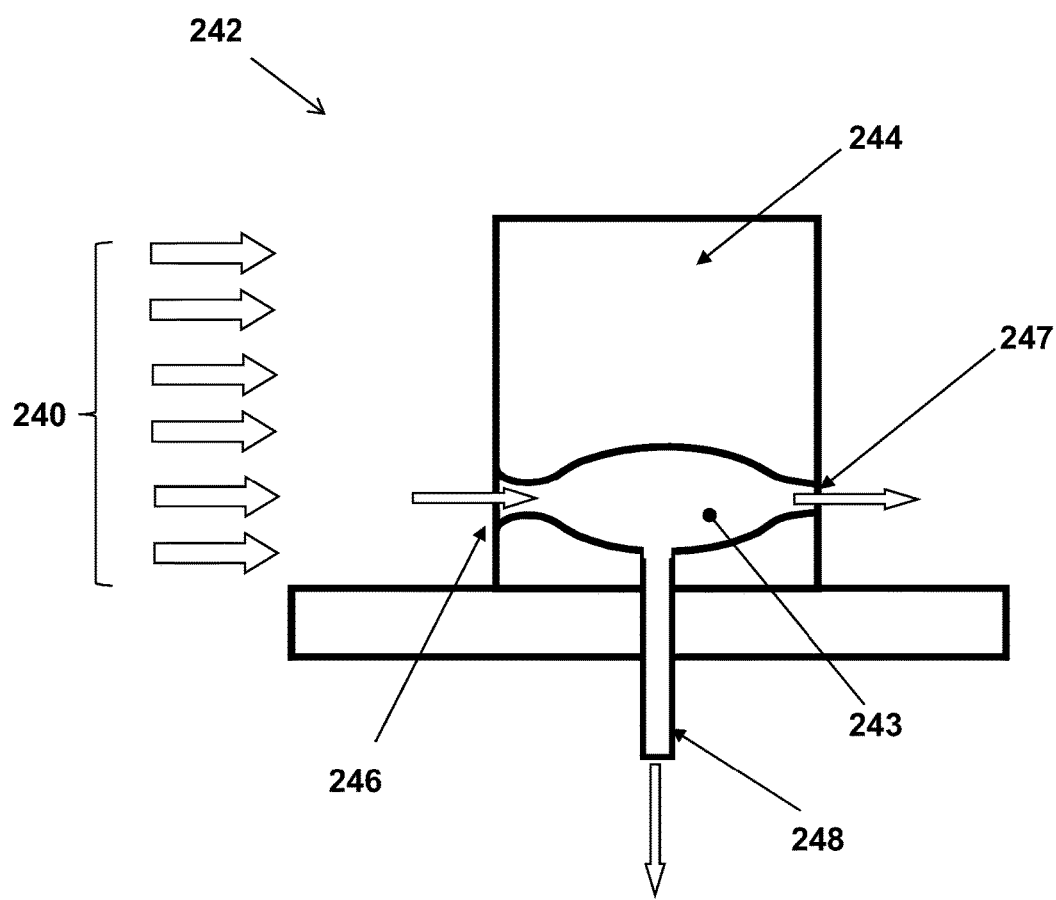
FIG. 5 shows a first alternative bypass off-take device.

FIG. 5 shows a first alternative bypass off-take device 242.

In FIG. 5, the first alternative bypass off-take device 242 has a first passage 243 that extends from an inlet 246 (which may be an aerodynamic off-take) to an outlet 247 in the direction of a bypass airflow 240, and a second passage 248 for extracting cooling air from the airflow, wherein the second passage 248 has an inlet that is a hole formed in a sidewall of the first passage 243 between the inlet 246 and outlet 247 of the first passage 243, preferably at or close to the point along the length of the first passage 243 at which the cross-sectional area of the first passage 243 reaches a maximum.

The inlet 246 may be formed in a strut 244 of the gas turbine engine (e.g. an "A" frame spat standing in bypass airflow 240).

The second passage 248, which may include a tube, preferably guides the extracted cooling air to the sealing unit 130, e.g. as previously described.

In this example, the cross-sectional area of the first passage 243, as measured in a direction perpendicular to the direction of airflow, preferably increases and then decreases as the first passage 243 progresses in the direction of the bypass airflow 240.

Here, because the first passage 243 has a cross-sectional area that increases and then decreases as the first passage 243 progresses in the direction of the airflow, it is thought that the reverse Venturi effect will elevate the pressure of the portion of the extracted cooling air to be above that of the static pressure of the airflow. This means that cooling air can be supplied to the shroud 124 described above at above the static pressure of the bypass airflow 240, which is useful for providing a continual flow of cooling air through the shroud 124.

Preferably, the second passage 248 is perpendicular or approximately perpendicular with the first passage 243 where it meets the first passage 243

An advantage of the geometry shown in FIG. 5 is that foreign objects entering the first passage 243 are even more likely to pass through the first passage 243 without blocking the second passage 248, compared with the geometry shown in FIG. 4. Also, the geometry shown in FIG. 5 should raise the static pressure higher than any of the other geometries described herein.

Figure 6:
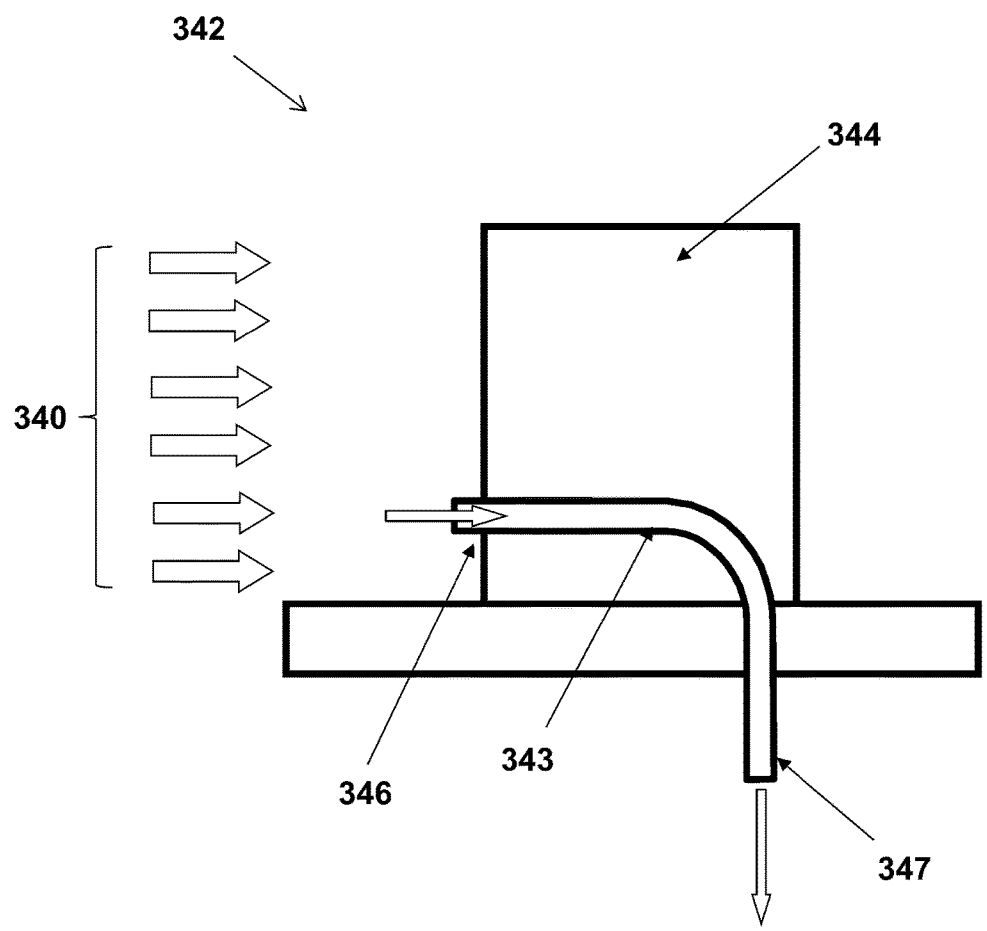
FIG. 6 shows a second alternative bypass off-take device.

FIG. 6 shows a second alternative bypass off-take device 342.

In FIG. 6, the second alternative bypass off-take device 342 has a single curved passage 343 that extends from an inlet 346 (which may be an aerodynamic off-take) to an outlet 347 which preferably guides the extracted cooling air to the sealing unit 130, e.g. via a tube.

This type of bypass off-take device is sometimes referred to as a Pitot tube, and is configured so that the pressure of the extracted cooling air is roughly equal to the total pressure of the bypass airflow 340.

The inlet 346 may be formed in a strut 344 of the gas turbine engine (e.g. an "A" frame spat standing in bypass airflow 340).

The second alternative bypass off-take device 342 shown in FIG. 6 is not preferred since there is a significantly increased risk of the single curved passage 343 being blocked by a foreign object compared with the devices shown in FIGS. 4 and 5.

To summarise the example described above, high pressure cooling air is collected and buffered to prevent fire zone to fire zone leakage of hazardous fluids including air, oil and fuel while facilitating the transmission of load and linear motion across the fire wall. The actuator may be located in a relatively cool/benign environment giving long life while a Bowden cable can be protected from degradation in the hotter environment by having cooling air flowing through it. This allows all of the components to be kept appropriately cool and so allows them to survive in the hot environment. Thus, an actuator may be used in a cool fire zone with an air cooled Bowden cable being used in a hot fire zone.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. For example, whilst the invention has been described above in relation to a three spool engine, the invention could equally be incorporated in another type of engine, e.g. a two spool engine.

For the avoidance of any doubt, any theoretical explanations provided herein are provided for the purposes of improving the understanding of a reader. The inventors do not wish to be bound by any of these theoretical explanations.

We claim:

1. A gas turbine engine comprising:
   a bypass duct through which air flows to provide propulsive thrust;
   an off-take device that is configured to extract cooling air from the bypass duct;
   a fire wall that is configured to provide a fire resistant barrier between a first zone and a second zone in the gas turbine engine, the second zone being hotter than the first zone when the gas turbine engine is in use;
   an actuator that is located in the first zone, the actuator being configured to generate a mechanical force;
   an actuatable device that is located in the second zone, the actuatable device being configured to be actuated by the mechanical force; and
   a mechanical force transmitting device that extends from the actuator to the actuatable device via a hole in the fire wall, the mechanical force transmitting device being configured to, when the actuator is operated, actuate the actuatable device by transmitting the mechanical force generated by the actuator to the actuatable device, the mechanical force transmitting device including:
      an elongate element configured to move along a linear path so as to transmit the mechanical force generated by the actuator to the actuatable device; and
      an elongate housing/shell, the elongate element being configured to move along the linear path within the elongate housing,
   wherein the off-take device is configured to supply the extracted cooling air into the elongate housing/shell.

2. The gas turbine engine according to claim 1, wherein the second zone has a temperature of 300° C. or higher when the gas turbine engine is in use.

3. The gas turbine engine according to claim 1, wherein the elongate element is a flexible cable.

4. The gas turbine engine according to claim 1, wherein the off-take device is configured so that the extracted cooling air is at a pressure that is higher than a static pressure of the airflow.

5. The gas turbine engine according to claim 1, wherein the off-take device includes:
   a first passage that extends from an inlet to an outlet in a direction of the airflow, wherein a cross-sectional area of the first passage, as measured in a direction perpendicular to the direction of the airflow, increases and then decreases along the first passage in the direction of the airflow; and
   a second passage to extract a portion of air from the airflow, wherein the second passage has an inlet that is a hole formed in a sidewall of the first passage between the inlet and the outlet of the first passage.

6. The gas turbine engine according to claim 1, wherein the elongate housing includes a coolant dumping device to allow spent extracted cooling air to exit the elongate housing in the second zone.

7. The gas turbine engine according to claim 1, wherein the gas turbine engine includes a sealing unit to seal the hole in the fire wall.

8. The gas turbine engine according to claim 7, wherein the sealing unit includes a primary seal and a secondary seal for inhibiting and/or preventing extracted cooling air from flowing out of the sealing unit into the first zone.

9. The gas turbine engine according to claim 1, wherein the first zone and the second zone are configured to receive and direct a continual flow of air.

* * * * *